UNITED STATES PATENT OFFICE.

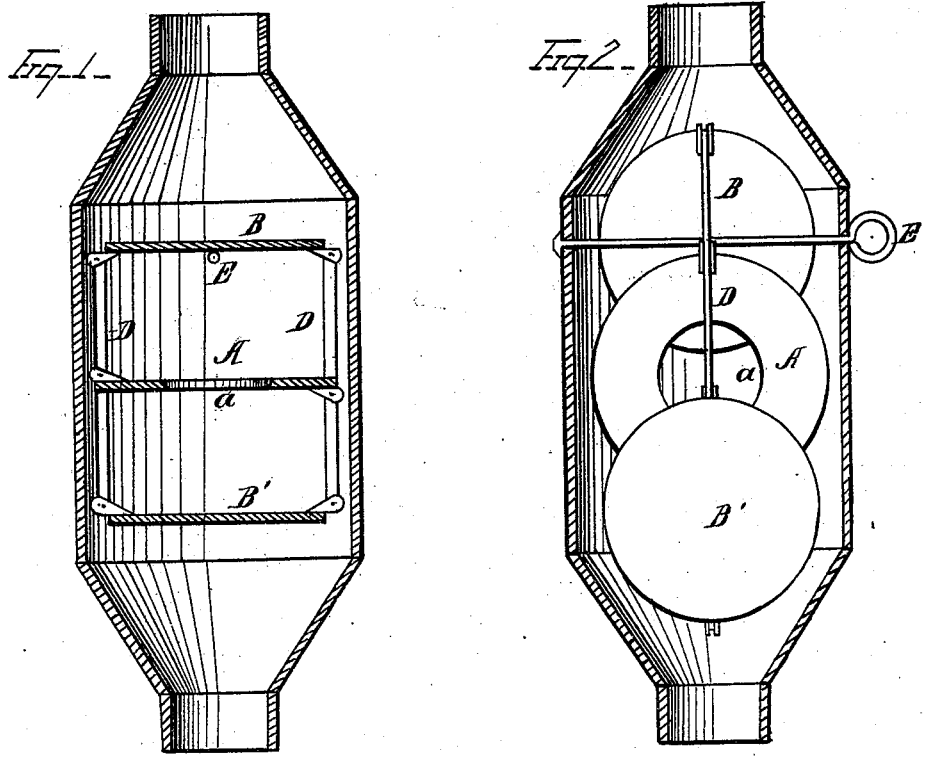

WILLIAM CULVEYHOUSE, OF LIGONIER, INDIANA.

IMPROVEMENT IN DAMPERS.

Specification forming part of Letters Patent No. 172,914, dated February 1, 1876; application filed January 14, 1876.

*To all whom it may concern:*

Be it known that I, WILLIAM CULVEYHOUSE, of Ligonier, in the county of Noble and State of Indiana, have invented certain new and useful Improvements in Heat-Dampers for Flues and Heating-Drums; and I do hereby declare the following to be a full, clear, and exact description of the invention, such as will enable others skilled in the art to which it pertains to make and use it, reference being had to the accompanying drawings, which form part of this specification.

My invention relates to an improvement in heat-dampers for flues and heating-drums, and for use in other similar localities; and consists in the combination of a large central disk or plate, which fills the flue or drum when placed across it, this central plate or disk having an opening through it, and in combination with the said central large disk, of an upper and a lower smaller disk, each continuous or not perforated. The three are so constructed that when placed across the flue or drum the products of combustion will pass outward around the first smaller disk, then in through the central opening of the central disk, and out around the edge of the other small disk; the three disks being united in such a manner that when one of them is turned from its position across the line of the draft into a position in the line of the draft all three of the said disks will turn simultaneously, and come into substantially the same plane, as will be hereinafter more fully described.

In the drawings, Figure 1 represents a vertical section by a plane containing the hinge-rods, and showing the disks in a position across the line of draft. Fig. 2 represents a similar sectional view, showing the disks in a position in the line of draft, or opened.

It is well known that the products of combustion, in passing through a flue or drum, are impeded along that portion adjacent to the walls of the drum by the friction against said walls, and that the main draft will take place through the center of the flue or drum without imparting their heat to the drum, whereby it may be radiated into the apartment. So, also, it is well known that the products of combustion in a furnace, or in other localities where all the heat is desired to be utilized—as, for instance, beneath a boiler—the furnace-walls and boundaries generally create and maintain adjacent to themselves a cooler stratum, which prevents the products of combustion from expending all their heat upon the boiler or other object desired to be heated, and the highly-heated products therefore pass into the escape-flues in an unobstructed course, and escape therefrom without being utilized.

It is the object of this invention to avoid both these difficulties, and this invention relates to a particular means employed for effecting these purposes.

A is the large central disk or plate, which, when thrown across the flue or drum, fills it. It is perforated by a central opening, $a$. B B' are upper and lower smaller continuous or unbroken disks. D are the rods or links which unite the three disks, and which govern their action. E is a handle rigidly attached to one of the said disks, whereby the said disks may be thrown across the line of draft, or brought into substantially the same plane in the line of draft, according as it is desired to create more heat or less heat, respectively. It is apparent that this improvement is equally applicable in square or rectangular drums or flues, and in cylindrical or conical drums and flues. So, also, it is apparent that the same handle E may govern a set of the said disks, as shown in the drawings; or, by extending the connecting rods or links D, the same handle may govern two or more sets of the said disks, as circumstances may require. So, also, it is apparent that many devices may be employed whereby, by turning one of the disks, all of the disks will be brought into substantially the same plane, the links or rods D being simply one means for effecting the purpose. It will be seen, also, that this method of turning the disks, whereby each disk is revolved, as it were, about one of its horizontal lines as an axis, enables the entire series to be properly operated within a drum or flue of sufficient size to permit any one of the large disks to turn therein; and it is also apparent that I am enabled to place the disks at any desired distance apart, the said distance between the disks not depending in any degree upon the diameter of the flue or drum.

In describing the operation of this damper

I will first suppose it to be attached to a radiating-drum. Suppose the dampers or disks to be placed in the position shown in Fig. 2, or open; in this position they permit a free draft through the drum, and permit a great portion of the heated products of combustion to escape into the flue above without the heat from the same being utilized. If it is desired to increase the heat the dampers are turned across the drum into the position shown in Fig. 1. The central course of the draft is thus impeded by the disk B, and the heated products of combustion are deflected around the edge of the said disk against the side of the drum; they are again deflected and passed through the central opening $a$ of the disk A; then again deflected outward around the upper disk B against the drum, and thence upward into the flue; or, if there be more than one series of said disks, the operation is repeated for each series, and thus the products of combustion are caused to expend all their heat directly upon the wall of the drum.

The operation of the device in a furnace is substantially as follows: Suppose this damper to be placed in the smoke-flue, as long as the damper is opened, as in Fig. 2, the heated products will take a central course through the furnace and through the center of the flue, and escape therefrom, much of them being unburned, because, lying within the cool stratum around the boiler and around the adjacent walls of the furnace, they are not sufficiently heated to be consumed; but are swept out by the general draft being outside of the line of central draft. If this damper is thrown into the position shown in Fig. 1, the conditions are immediately changed; sufficient draft is still maintained in the furnace, but this central line of draft is broken up, and the intensely-heated products of combustion are caused to back up and mingle with what we have termed the cooler stratum, causing a more perfect combustion of the carbon from the fuel, and also causing a much greater heat to be expended upon the adjacent boiler and other surfaces, as, by a mingling of the products of combustion, the temperature in all parts of the furnace is kept substantially at a uniform degree.

What I claim is—

A heat-damper consisting of central large disk or plate A, with opening $a$, and upper and lower smaller unbroken disks or plates B B', the whole series united by flexible joints, and arranged substantially as described, to bring all the disks into nearly the same plane by turning either disk, substantially as set forth, and for the purposes described.

In testimony whereof I have signed my name to this specification in the presence of two subscribing witnesses.

WILLIAM CULVEYHOUSE.

Witnesses:
DAVID SIMMONS,
JOHN M. CHAPMAN.